United States Patent [19]

Kameda

[11] Patent Number: 5,351,782
[45] Date of Patent: * Oct. 4, 1994

[54] POWER TRAIN CONSTRUCTION OF VEHICLE

[75] Inventor: Osamu Kameda, Hiroshima, Japan

[73] Assignee: Mazda Motor Corporation, Hiroshima, Japan

[*] Notice: The portion of the term of this patent subsequent to Jul. 27, 2010 has been disclaimed.

[21] Appl. No.: 961,775

[22] Filed: Oct. 14, 1992

[30] Foreign Application Priority Data

Oct. 17, 1991 [JP] Japan ................................ 3-267988

[51] Int. Cl.⁵ .............................................. B60K 5/04
[52] U.S. Cl. ....................................... 180/297; 180/292
[58] Field of Search ............... 180/292, 297, 245, 147, 180/148, 78; 475/200

[56] References Cited

U.S. PATENT DOCUMENTS

| | | | |
|---|---|---|---|
| 5,040,634 | 8/1991 | Moriyama et al. | 180/147 X |
| 5,064,017 | 11/1991 | Kikuchi et al. | 180/297 X |
| 5,078,229 | 1/1992 | Kikuchi et al. | 180/297 X |
| 5,129,476 | 7/1992 | Kikuchi et al. | 180/297 X |
| 5,188,574 | 2/1993 | Echigo et al. | 180/297 X |
| 5,230,401 | 7/1993 | Kameda et al. | 180/297 |

FOREIGN PATENT DOCUMENTS

| | | | |
|---|---|---|---|
| 3838073 | 5/1990 | Fed. Rep. of Germany . | |
| 0231228 | 9/1990 | Japan | 180/297 |

Primary Examiner—Brian L. Johnson
Attorney, Agent, or Firm—Sixbey, Friedman, Leedom & Ferguson

[57] ABSTRACT

In a four-wheel drive motor vehicle in which an engine and a transmission are in parallel with each other, the transmission is arranged at the rear of the rearwardly inclined engine, and a front-wheel drive shaft is disposed under the transmission. A bevel gear of a transfer device is arranged in a space before the drive shaft and under the engine. The rear part of a drive pinion engaging with the bevel gear is connected to a propeller shaft. An exhaust pipe is connected to a rear part of the engine, and a steering shaft extending in a car width direction is disposed under the exhaust pipe. A connecting part for connecting the transfer device and the propeller shaft is located at the front of the steering shaft. Accordingly, the bevel gear is positioned appropriately when transmitting a drive power from the transfer device to the propeller shaft, and the power train is easily assembled into an engine compartment of the vehicle.

19 Claims, 5 Drawing Sheets

POWER TRAIN CONSTRUCTION OF VEHICLE

BACKGROUND OF THE INVENTION

This invention relates to a power train construction of a vehicle.

As a conventional power train construction, there is known a technique disclosed in, for example, Laid Open Unexamined German Patent Application No. 3,838,073, in which an engine and a transmission are disposed parallel to one another in a direction of movement of a vehicle in such a manner that an axial line of a crankshaft of the engine is in a car width direction of the vehicle, the transmission is arranged at the rear of the engine, and an axis of the transmission is in parallel with the crankshaft of the engine. In this prior art reference, a front axle of the vehicle is located under the transmission, the engine is inclined in a rearward direction of the vehicle, and a driving power transmitted from the engine to the transmission is transmitted to rear wheels from a propeller shaft extending in the vehicle movement direction or longitudinal direction of the vehicle through the medium of a transfer device having a bevel gear for changing a transmitted direction of the driving power by 90°. As to an exhaust system of the engine, arranged on a rear side of the engine is an exhaust port which is connected to an exhaust pipe extending obliquely, downwardly in a rearward direction of the vehicle.

On the other hand, in general, front wheels are steered in such a manner that rotation of a steering wheel in a compartment is transmitted to right and left front wheels via a steering shaft disposed widthwise of the vehicle.

In the power train construction of the above-noted reference, however, since the engine is inclined in a rearward direction of the vehicle, a ground clearance of the vehicle where the steering shaft is disposed is lowered. Particularly, in a power train construction where the exhaust pipe is connected to the exhaust port located on the rear side of the engine, since the exhaust pipe occupies a space behind the engine, a ground clearance of the steering shaft is further lowered, so as to be the same ground clearance of the axis of the front wheels. Consequently, when the transfer device is disposed under the steering shaft, the lowest ground clearance of the vehicle cannot be ensured because a lower part of the bevel gear having a large diameter extrudes downward. On the other hand, in a power train construction where the transfer device is disposed at the rear of the steering shaft, the whole power train including the transfer device lies along the longitudinal direction of the vehicle, which causes no compaction of the power train in the longitudinal direction. Further, when an upstream portion of the exhaust pipe is connected to the rear side of the engine, the whole power train including the exhaust pipe on the upstream side and the transfer device is extruded at upper and lower parts thereof rearward of the vehicle and is hollowed at an intermediate part thereof. As a result, when the whole power train is assembled by lowering the power train from above to an engine compartment of the vehicle at one time, to a set position of the engine compartment of the vehicle in which the steering shaft is already assembled, the steering shaft blocks the assembling, which results in difficult assembling of the power train within the engine compartment.

SUMMARY OF THE INVENTION

An object of the present invention is compaction of the whole power train in the longitudinal direction of the vehicle, while ensuring the lowest ground clearance of the vehicle, and easy assembling of the whole power train at one time to a set position in the engine compartment regardless of the presence of the steering shaft by arranging the bevel gear of the transfer device at an appropriate position and by forming the power train into an appropriate shape as a whole.

To attain the above objects, the present invention has been made in view that the engine is inclined rearward of the vehicle. According thereto, the bevel gear of the transfer device is disposed at a space before the front-wheel axle and under the engine, and the lower part of the power train is set shorter in the longitudinal length than the space before the steering shaft in the engine compartment.

To attain the objects in the present invention, a power train construction of a vehicle having an engine whose crankshaft is disposed in a car width direction, and a transmission arranged along a length of the engine and an axis of which is in parallel with the crankshaft of the engine is provided, wherein the engine is inclined in a rearward direction of the vehicle and an exhaust pipe is connected to the rear side of the engine, comprises a front wheel axle located under the transmission; a transfer device for transmitting a driving power to a propeller shaft, a bevel gear of which is disposed between the front-wheel axle and the engine; a steering shaft located between the propeller shaft and the exhaust pipe and extending in a car width direction; and a connecting part of the transfer device and the propeller shaft located at the front of the steering shaft.

Another means for attaining the objects is to provide a power train construction of a vehicle having an engine whose crankshaft is disposed in a car width direction, and a transmission located along a length of the engine an axis of which is in parallel with the crankshaft of the engine, wherein the engine is inclined in a rearward direction of the vehicle, comprises a front wheel axle located under the transmission; a transfer device for transmitting a driving power to the propeller shaft, a bevel gear of which is disposed between the front-wheel axle and the engine.

Another means for attaining the objects is to provide: a power train construction of a vehicle in which an exhaust pipe is connected to a rear side of an engine, comprising a steering shaft extending In a car width direction and disposed between the exhaust pipe and a propeller shaft; and a connecting part of the propeller shaft and a transfer device for transmitting a driving power to the propeller shaft, which is located at the front of the steering shaft.

A cylinder block of the engine which is essential thereto is integrally formed with a casing of the transmission.

A lower block of the engine which is essential thereto is integrally formed with a casing of the transfer device.

In addition, in the present invention, the vehicle is a four-wheel drive motor vehicle in which a center differential is arranged at a drive shaft of the front wheels.

With the above construction in the present invention, since the large diameter bevel gear of the transfer device is disposed in a space before the steering shaft and under the engine, a ground clearance thereof is comparatively set high, thus ensuring the lowest ground clearance. Further, since the bevel gear is located at the front, compared with a case where the bevel gear is located below or behind the steering shaft, the power train is compacted as a whole.

Moreover, since the connecting part of the transfer device and the propeller shaft is located before the steering shaft, it is easy to assemble the whole power train into an engine compartment of the vehicle to which the steering shaft already is assembled with the exhaust pipe arranged above the steering shaft, without interference of the steering shaft, only by lowering the whole power train from above into the engine compartment. After the assembling, a front end part of the propeller shaft is connected to the transfer device.

The rigidity of the power train is enhanced as a whole since a cylinder block of the engine and a casing of the transmission are formed integrally.

Further, since a lower block of the engine and the casing of the transfer device are formed integrally, in the case of applying to a front-wheel drive motor vehicle or a four-wheel drive motor vehicle, only the integral portion is exchanged, which means a common use of the cylinder block of the engine and of the device.

In addition, since the center differential is arranged at the drive shaft of the front wheels, a support shaft for the center differential is unnecessary, which leads to a simplification of the power train construction of the vehicle.

These and other objects, features and advantages of the invention will become more apparent upon a reading of the following detailed specification and drawings.

BRIEF DESCRIPTION OF THE DRAWINGS

Drawings show preferred embodiments of the present invention, in which.

PREFERRED EMBODIMENT OF THE INVENTION

Figure 1:
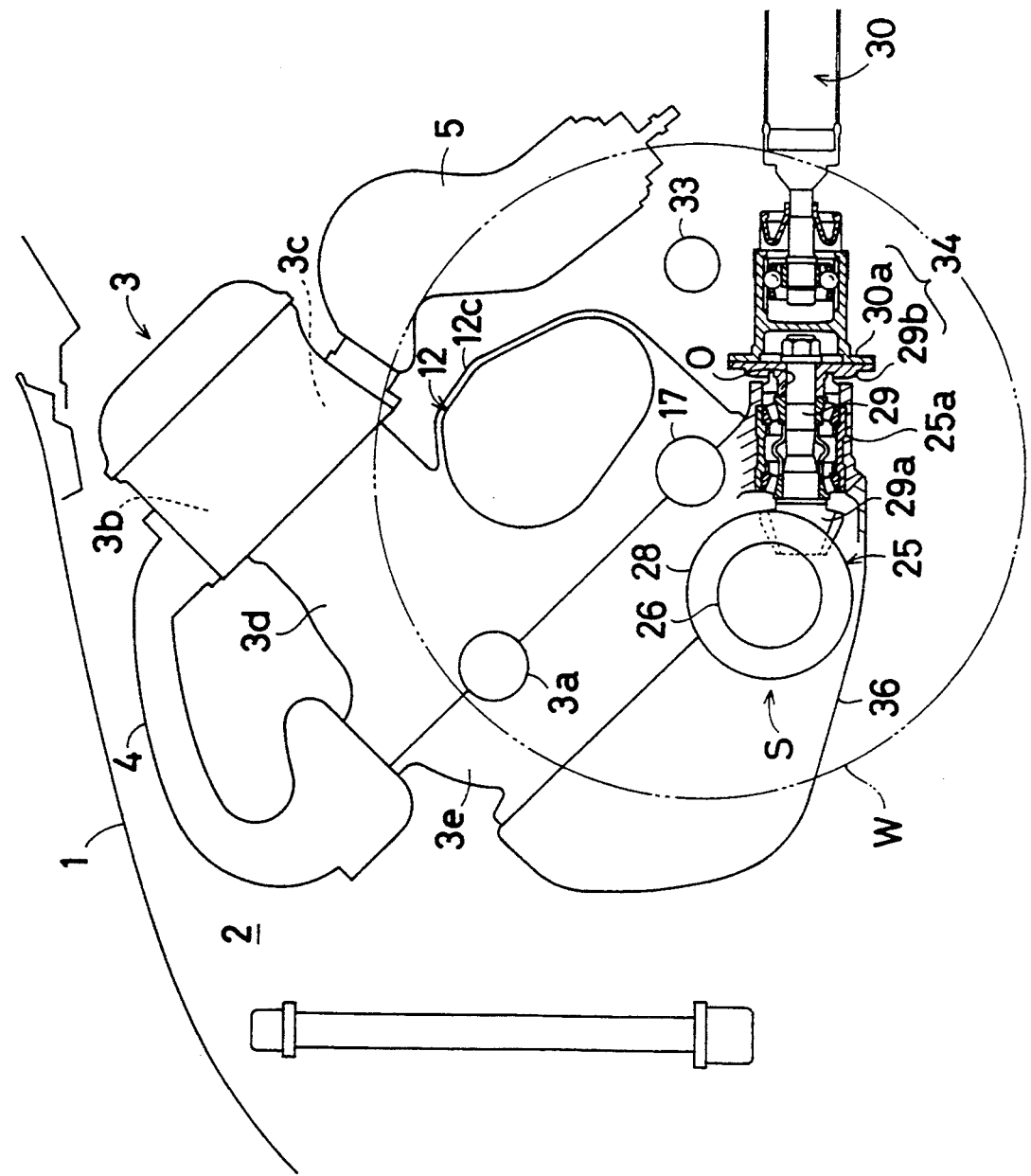
FIG. 1 is a side view showing a power train construction of a vehicle.

Referring to the drawings, preferred embodiments of the present invention are described below.

Figure 2:
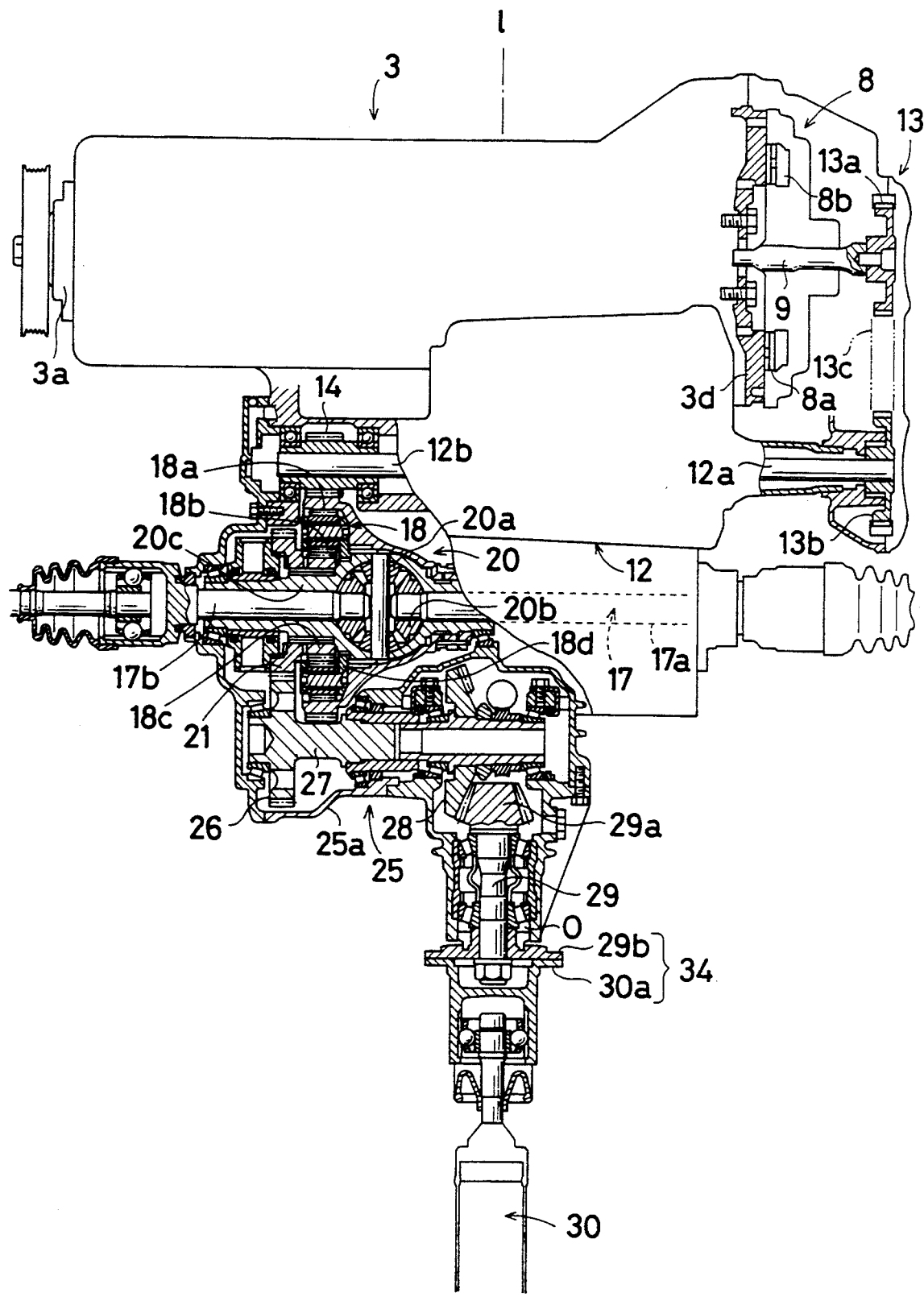
FIG. 2 is a development partly in section showing a whole power train construction of the vehicle.

FIGS. 1 and 2 show a power train construction of a vehicle in an embodiment of the present invention applied to a four-wheel drive motor vehicle.

In each drawing, a reference numeral 1 designates a bonnet or hood of the vehicle and 2 designates an engine compartment formed under the bonnet 1. A multiple valve engine 3 is disposed transversely in a car width direction of the vehicle in the engine compartment in such a fashion that a crankshaft 3a thereof is arranged in the car width direction. As shown in FIG. 1, the engine 3 is inclined in a rearward direction of the vehicle and an intake port 3b and an exhaust port 3c thereof are arranged respectively on a front side of the vehicle and on a rear side thereof. An intake pipe 4 extending forward of the vehicle communicates with the intake port 3b, and an exhaust pipe S communicates with the exhaust port 3c. The exhaust pipe 5 extends in a rearward direction of the vehicle and obliquely downward.

Disposed at a right end part of the engine 1 in FIG. 2 is a clutch device 8 having a clutch disk 8a connected to an output shaft 9 and a pressure plate 8b. During operation thereof, an engine output is transmitted to the output shaft 9 by the pressure plate 8b by way of the clutch disk 8a which is in frictional engagement with a flywheel 3d connected to an end part of the crankshaft 3a of the engine 3.

A transmission 12 having, for example, four stages for advance and one stage for retreat is disposed at the rear of a right side part of the engine 3 in FIG. 2. The transmission 12 is disposed in the engine compartment 2 in such a manner that an input shaft 12a and an output shaft 12b thereof are in parallel with the crankshaft 3a of the engine 3. Disposed between the transmission 12 and the clutch device 8 is a power transmitting mechanism 13 composed of a drive sprocket 13a connected to a right end of the output shaft 9 in FIG. 2, a driven sprocket 13b connected to the input shaft 12a of the transmission 12 and a chain 13c trained between both sprockets 13a, 13b. The driving power transmitted to the output shaft 9 at a connected state of the clutch device 8 is transmitted to the input shaft 12a of the transmission 12 via the power transmitting mechanism 13.

On the other hand, the output shaft 12b of the transmission 12 extends to a left part of the engine 3 in FIG. 2. A final drive pinion 14 is provided at the extending portion.

As shown in FIG. 1, a drive shaft 17 of front wheel W extends in a car width direction under the transmission 12. At the drive shaft 17, as shown in FIG. 2, a center differential 18 is disposed just below the final drive pinion 14 of the transmission 12, and a differential 20 for the front wheels is disposed right of the center differential 18 in FIG. 2.

The center differential 18 has a function of absorbing a difference of the rotation of the front wheels and that of the rear wheels at a turn of the vehicle, and is of a planet gear type which is composed of a ring gear 18a engaging with the final drive pinion 14 of the transmission 12, a plurality of pinion gears 18b engaging with the ring gear 18a, and a sun gear 18c engaging with the pinion gears 18b, wherein the sun gear 18c is disposed on a casing 20c of the differential 20 for the front wheel.

The front-wheel differential 20 has two pinon gears 20a and two side gears 20b connected to right and left shaft parts 17a, 17b of the front-wheel drive shaft 17. The pinion gears 20a are connected via the casing 20c to a carrier 18d connected to a right side part in FIG. 2 of the pinion gears 18b of the center differential 18. A reduction gear 21 is integrally formed at the sun gear 18c of the center differential 18 on an opposite side of the front-wheel differential 20.

Further, as shown in FIG. 1, a transfer device 25 for transmitting the driving power transmitted to the center differential 18 to the rear wheels is disposed at the front of the vehicle and obliquely below the front-wheel drive shaft 17. The transfer device 25 has, as shown in FIG. 2, a reduction gear 26 engaging with the sun gear 18c of the center differential 18, a support shaft 27 arranged in a car width direction for supporting the reduction gear 26, a bevel gear 28 supported by the support shaft 27 and disposed just left to a center line 1 in the car width direction, and a drive pinion 29 having a bevel gear part 29a engaging with the bevel gear 28 and substantially disposed on the center line 1 in the car width direction.

In addition, at the rear of the drive pinion 29 of the transfer device 25, a propeller shaft 30 for transmitting the driving power to the rear wheels extends from an axial line of the pinion 29.

The bevel gear 28 of the transfer device 25 is, as shown in FIG. 1, arranged in a space S arranged before the front-wheel drive shaft 17 and under the engine 3. Though an axial center of the bevel gear 28 is located lower than the front-wheel drive shaft 17, an upper end of the bevel gear 28 is higher than an axial center of a steering shaft 33 which is described later.

Between the exhaust pipe 5 of the engine 3 and the propeller shaft 30, as shown in FIG. 1, the steering shaft 33 extending in the car width direction is arranged and right and left ends thereof (not shown) are connected to respective right and left front wheels. Because of the exhaust pipe 5 extending obliquely downward, the axial center of the steering shaft 33 is located lower than that in case without the exhaust pipe, and slightly higher than the axial center of the front-wheel drive shaft 17.

As also shown in FIG. 1, a connecting part 34 for connecting, by means of a bolt, a flange part 29b formed at a rear end part of the drive pinon 29 of the transfer device 25 and a flange part 30a formed at a front end part of the propeller shaft 30 is located approximately at the middle between the steering shaft 33 and the front-wheel drive shaft 17.

As further shown in FIG. 1, at a boundary of an axial line that connects a center of the crankshaft 3a and a center of the front-wheel drive shaft 17, the engine 3 is divided into a cylinder block 3d at an upper part thereof and a lower block 3e at a lower part thereof. The lower block 3e is connected to an oil pan 36 at a lower surface thereof. A rear part of the cylinder block 3d extends obliquely downward to be formed integrally with a casing 12c of the transmission 12. A rear part of the lower block 3e of the engine 3 also extends obliquely downward to be formed integrally with a casing 25a of the transfer device 25. The extension part of the lower block 3e covers to an outer periphery of the drive pinion 29 of the transfer shaft 25, and has an opening O for connecting to the flange part 29b of the transfer device 25 at a rear part thereof.

Accordingly, in the above embodiment, because the ground clearance of the steering shaft 33 is approximately the same as that of the front-wheel drive shaft 17, the large diameter bevel gear 28 of the transfer device 25 is prevented from being arranged under the steering shaft 33 in relation to the lowest ground clearance of the vehicle. However, since the bevel gear 28 is arranged in the space S before the front-wheel drive shaft 17, the level of the axial center of the bevel gear 28 can be set higher to nearly the level of the front-wheel drive shaft 17, thus ensuring the lowest ground clearance of the vehicle.

Further, since the bevel gear 28 of the transfer device 25 is arranged at the front of the front-wheel drive shaft 17, as described above, the power train is compacted in the longitudinal direction of the vehicle, compared with the case where the bevel gear 18 is arranged at the rear of the steering shaft 33.

While the engine 3 is connected at the rear part thereof to the exhaust pipe 5, the connecting part 34 of the transfer device 25 and the propeller shaft 30 is located at the front of the steering shaft 33. Therefore, the whole power train including the exhaust pipe 5 and the transfer device 25 can be assembled into the engine compartment 2 of the vehicle to which the steering shaft 33 already is assembled without interference with the steering shaft 33 merely by lowering the whole power train from above into the engine compartment 2. Thus the assembling of the power train is facilitated.

Since the cylinder block 3d of the engine 3 and the casing 12c of the transmission 12 located at the rear of the cylinder block 3d are formed integrally, the rigidity of the power train is enhanced as a whole.

Further, since the engine 3 is separated into the cylinder block 3d and the lower block 3e, when the engine 3 for the four-wheel drive motor vehicle in this embodiment is embarked to a front-wheel drive motor vehicle, only the lower block 3e is exchanged, which means that the cylinder block 3d can be used without modification and that the device can be used in common.

Since the center differential 18 is arranged at the front-wheel drive shaft 17, the support shaft thereof can be dispensed with, thus compacting the power train of the four-wheel drive motor vehicle.

Figure 3:
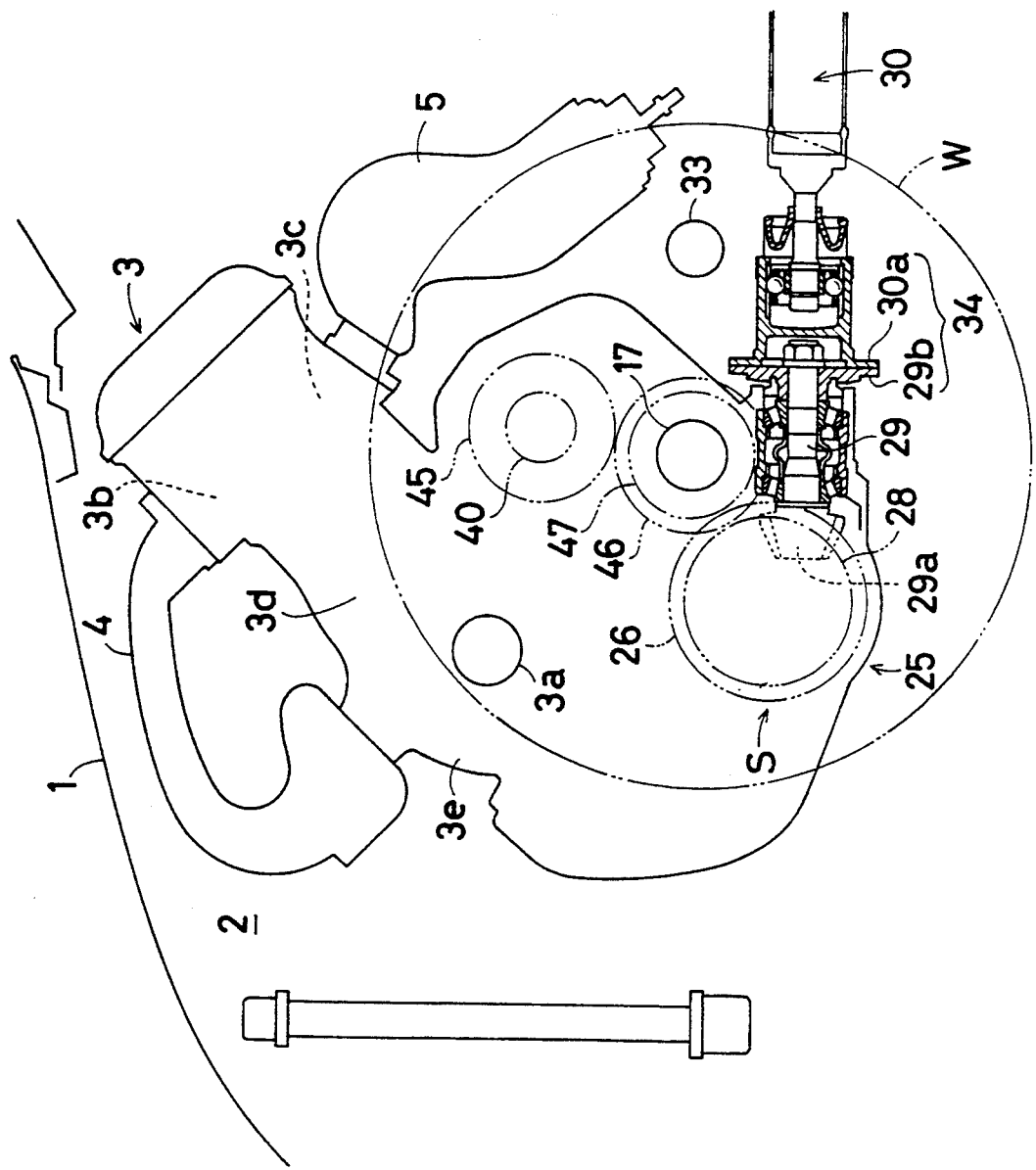
FIG. 3 is a side view showing a power train construction of a vehicle in another embodiment.
Figure 4:
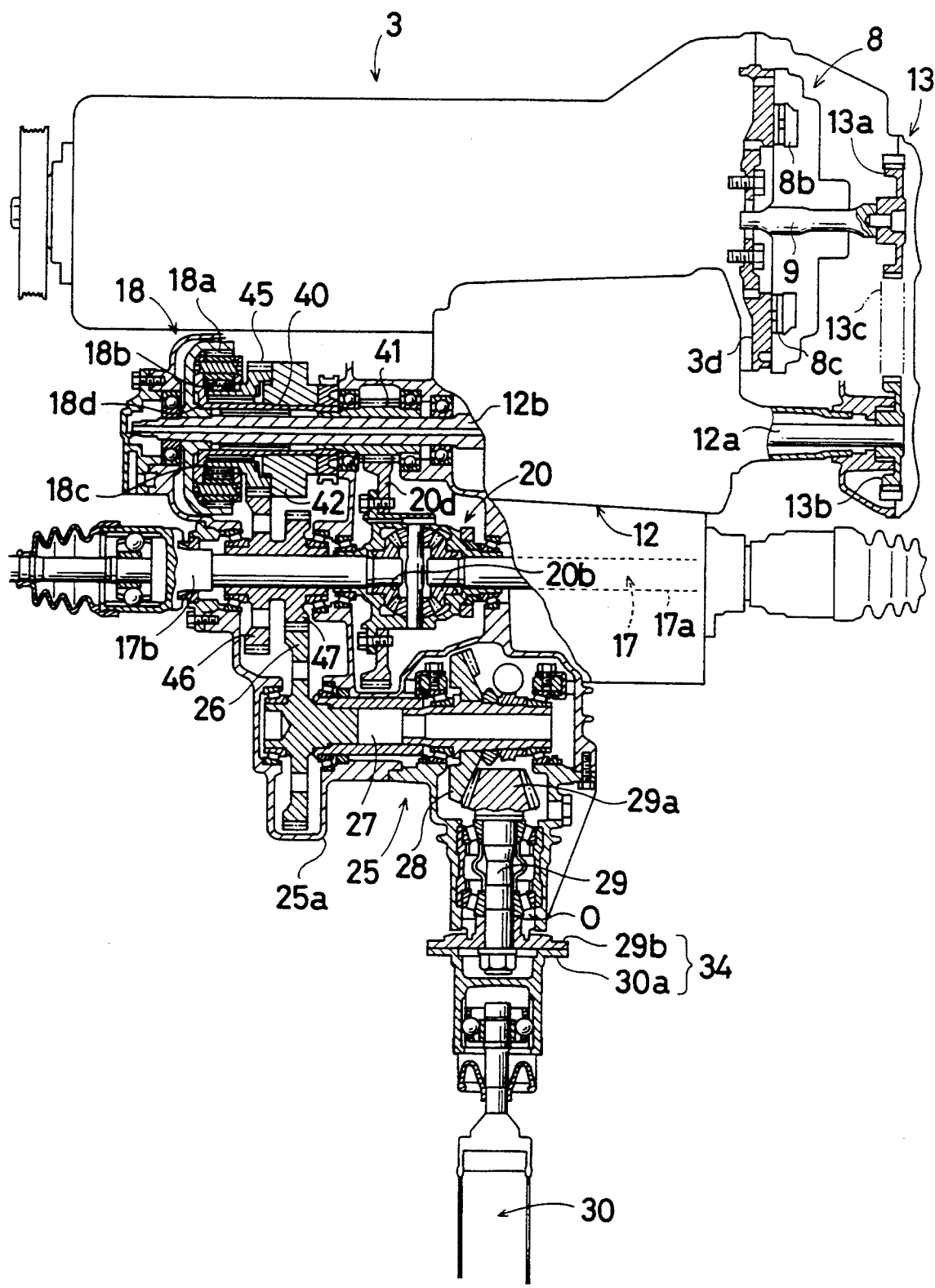
FIG. 4 is a development partly in section showing a whole power train construction of a vehicle in another embodiment.

FIGS. 3 and 4 show a power train construction of a vehicle in another embodiment, in which the center differential 18 is arranged on the output shaft 12b of the transmission 12, instead, the center differential 18 is arranged at the front-wheel drive shaft 17 as in the first embodiment.

In detail, in FIGS. 3 and 4, the output shaft 12b of the transmission 12 extends to the left side of the vehicle, and the center differential 18 is arranged at a left end part of the extension part. The carrier 18d of the center differential 18 is formed integrally with an axis 40 arranged coaxially with the output shaft 12b at an outer part of the output shaft 12b of the transmission 12. A reduction gear 41 integrally formed on the right side part of the axis 40 engages with the ring gear 20d of the front-wheel differential 20. The front-wheel differential 20 is located between the transmission 12 and the center differential 18 in the car width direction.

Between the center differential 18 and the reduction gear 41, a viscous coupling 42 is arranged for restricting a differential motion of the center differential 18.

In the center differential 18, a reduction gear 45 is integrally formed with the sun gear 18c at the right part of the sun gear 18c, and engages with a reduction gear 46 disposed at the front-wheel drive shaft 17. A second reduction gear 47 is integrally formed with the reduction gear 46 at the right part of the reduction gear 46 in the drawing, and engages with a reduction gear 26 integrally formed with the support shaft 27 of the transfer device 25 at a left end part of the support shaft 27 in the drawing.

In this embodiment, also, the bevel gear 28 of the transfer device 25 is arranged in the space S before the front-wheel drive shaft 17 and under the engine 3, and the steering shaft 33 is arranged between the exhaust pipe 5 of the engine 3 and the propeller shaft 30. The connecting part 34 for connecting the transfer device 25 and the propeller shaft 30 is located at the front of the steering shaft 33. Since the other construction in this embodiment is the same as in first above embodiment, the explanation is omitted, applying the same reference numerals to the respective same parts.

Accordingly, in this embodiment as in the first embodiment, since the bevel gear 28 of the transfer device 25 is arranged at the front of the front-wheel drive shaft 17, the power train is compacted in the longitudinal direction of the vehicle, while ensuring the lowest ground clearance of the vehicle. Moreover, since the connecting part 34 is located at the front of the steering shaft 33, the whole power train including the exhaust pipe 5 and the transfer device 25 can be easily assembled into the engine compartment 2, which leads to an improvement in assembling of the power train to the vehicle.

Figure 5:
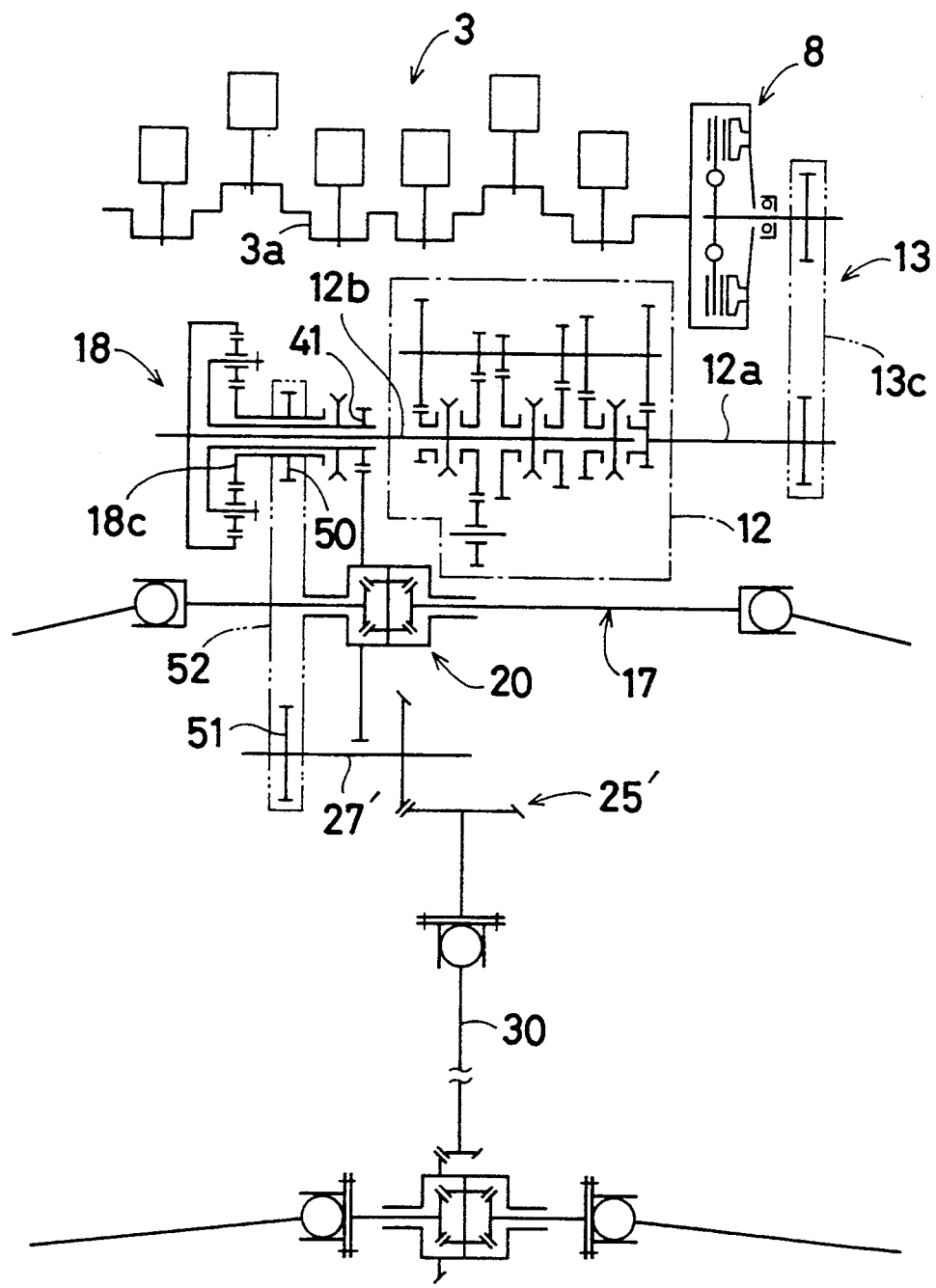
FIG. 5 is a skeleton view showing a power train construction in a modified example.

FIG. 5 shows a modified example of power transmission from the center differential 18 to the transfer device 25, in which the power is transmitted via a chain, instead the power is transmitted via the two reduction gears 46, 47 arranged at the four-wheel drive shaft as in the second embodiment.

In detail, in FIG. 5, the sun gear 18c of the center differential 18 is connected to a drive sprocket 50, and the support shaft 27' of the transfer device 25' is connected at the left end thereof in the drawing to a drive sprocket 51. Between both sprockets 50, 51, the chain 52 is trained for transmitting a driving power transmitted to the center differential 18 to the transfer device 25' through the medium of the chain 52.

I claim:

1. A power train construction of a vehicle having an engine whose crankshaft is disposed in a car width direction, a transmission connected with and arranged along a longitudinal direction of said engine an axis of which is in parallel with said crankshaft of said engine, a bevel gear of a transfer device connected with the transmission and which receives a driving power changed by the transmission and which changes a transmitting direction of the driving power, and a propeller shaft which is connected with said bevel gear of the transfer device by a connecting part, extends in the longitudinal direction of the vehicle and transmits the driving power transmitted to the bevel gear of the transfer device to the rear wheels, with said engine being inclined rearward of the vehicle and an exhaust pipe is connected to the rear side of said engine, said power train construction comprising:
   a front-wheel axle located under said transmission; and
   a steering shaft arranged between said propeller shaft and said exhaust pipe and extending in a car width direction; wherein,
   the bevel gear of said transfer device is disposed between, viewing from an upper side of the vehicle, said front-wheel axle and a bottom of a front end portion of said engine; and
   the connecting part which connects said bevel gear of said transfer device and said propeller shaft is located forward of said steering shaft.

2. The power train construction according to claim 1, wherein a cylinder block of said engine is integrally formed with a casing of said transmission.

3. The power train construction according to claim 1, wherein a lower block of said engine is integrally formed with a casing of said transfer device.

4. The power train construction according to claim 2, wherein a lower block of said engine is integrally formed with a casing of said transfer device.

5. The power train construction according to claim 1, wherein said vehicle is a four-wheel drive motor vehicle, and a center differential is arranged at a drive shaft for front wheels.

6. The power train construction according to claim 1, wherein said transmission is arranged at the rear side of said engine.

7. The power train construction according to claim 1, wherein an axial center of said steering shaft is located approximately at the same height as an axial center of said front-wheel axle.

8. The power train construction according to claim 1, wherein an upper end of said bevel gear of said transfer device is located approximately at the same height as an axial center of said front-wheel axle.

9. The power train construction according to claim 1, wherein said vehicle is a four-wheel motor vehicle, an output shaft of said transmission extends in a car width direction, and a center differential is arranged at an extension part of said transmission.

10. A power train construction of a vehicle having an engine whose crankshaft is disposed in a car width direction, and a transmission connected with and arranged along a longitudinal direction of said engine, an axis of which is in parallel with said crankshaft of said engine, a bevel gear of a transfer device connected with the transmission which receives a driving power changed by the transmission and which changes a transmitting direction of the driving power, and a propeller shaft which is connected with said bevel gear of the transfer device by a connecting part, extends in the longitudinal direction of the vehicle and transmits the driving power transmitted to the bevel gear of the transfer device to the rear wheels, with said engine being inclined rearward of the vehicle, the power train construction comprising:
   a front-wheel axle arranged under said transmission; wherein
   the bevel gear of said transfer device is disposed between, viewing from an upper side of the vehicle, said front-wheel axle and a bottom of a front end portion of said engine.

11. The power train construction according to claim 10 wherein a cylinder block of said engine is integrally formed with a casing of said transmission 12. The power train construction according to claim 10, wherein a lower block of said engine is integrally formed with a casing of said transfer device.

13. The power train construction according to claim 10 wherein said vehicle is a four-wheel drive motor vehicle, and a center differential is arranged at a drive shaft for front wheels.

14. The power train construction according to claim 10 wherein said transmission is arranged at the rear side of said engine.

15. The power train construction according to claim 10, wherein an axial center of said steering shaft is located approximately at the same height as an axial center of said front-wheel axle.

16. The power train construction according to claim 10, wherein an upper end of said bevel gear of said transfer device is located at approximately the same height as an axial center of said front-wheel axle.

17. The power train construction according to claim 13, wherein said center differential is arranged at a left side of a differential for front wheels.

18. The power train construction according to claim 13, wherein said center differential includes a sun gear which is integrally formed with a reduction gear for transmitting a driving power to rear wheels at an opposed side of a differential for front wheels.

19. A power train construction of a vehicle in which an exhaust pipe is connected to a rear side of a rearwardly inclined engine, the power train construction comprising:

a bevel gear of a transfer device connected with a transmission and which receives a driving power changed by the transmission and which changes a transmitting direction of the driving power, a propeller shaft which is connected with said bevel gear of the transfer device by a connecting part and which extends in the longitudinal direction of the vehicle and transmits the driving power transmitted to the bevel gear of the transfer device to the rear wheels; and a steering shaft extending in a car width direction and disposed between said exhaust pipe and said propeller shaft;

wherein the connecting part which connects said propeller shaft and said transfer device is located forward of said steering shaft.

* * * * *